United States Patent
Mumaw et al.

(10) Patent No.: US 6,211,650 B1
(45) Date of Patent: Apr. 3, 2001

(54) BATTERY CELL BY-PASS CIRCUIT

(75) Inventors: Susan J. Mumaw, Littleton; Jeffrey Evers; Calvin L. Craig, Jr., both of Parker; Stuart D. Walker, Littleton, all of CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/482,150

(22) Filed: Jan. 12, 2000

(51) Int. Cl.[7] .......................................... H02J 7/00
(52) U.S. Cl. ............................. 320/122; 320/120
(58) Field of Search .................... 320/122, 120, 320/119, 116, 117

(56) References Cited

U.S. PATENT DOCUMENTS

| | | | |
|---|---|---|---|
| 5,049,804 | 9/1991 | Hutchings | 320/110 |
| 5,164,652 | 11/1992 | Johnson et al. | 320/125 |
| 5,420,493 | 5/1995 | Hargadon et al. | 320/125 |
| 5,539,299 | 7/1996 | Fernandez et al. | 320/163 |
| 5,818,199 | 10/1998 | Beard | 320/116 |
| 5,853,908 | 12/1998 | Okutoh | 429/7 |
| 5,932,990 | * 8/1999 | Kaneko | 320/122 |
| 5,982,145 | 11/1999 | Eguchi | 320/128 |
| 6,014,013 | * 1/2000 | Suppanz et al. | 320/122 |

\* cited by examiner

*Primary Examiner*—Peter S. Wong
*Assistant Examiner*—Lawrence Luk
(74) *Attorney, Agent, or Firm*—Louis L. Dachs

(57) ABSTRACT

The invention is a circuit and method of limiting the charging voltage applied to an individual cell of a plurality of cells making up a battery being charged in series. It is particularly designed for use with batteries that can be damaged by overcharging, such as Lithium-ion type batteries. In detail, the method includes the following steps: sensing the actual voltage level of the individual cell; comparing the actual voltage level of the individual cell with a specific voltage level and providing an error signal representative thereof; and by-passing the charging current around the individual cell necessary to keep the individual cell voltage level generally equal to the specific voltage level while continuing to charge the remaining cells. Preferably this is accomplished by by-passing the charging current around the individual cell if said actual voltage level is above the specific voltage level and allowing the charging current to the individual cell if the actual voltage level is equal or less than the specific voltage level. In the step of bypassing the charging current the current is accomplished by dissipating the by-passed current as heat. The by-pass circuit for limiting the charging voltage applied to an individual cell of a series of cells forming a battery, the cells being charged in series includes a voltage detection circuit to sense the actual voltage level of the individual cell. A voltage comparison circuit is used to compare the actual voltage level of the individual cell with a reference value and to provide an error signal representative thereof. A third circuit, designed to be responsive to the error signal, is provided for bypassing charging current from the individual cell if the actual voltage level is above the specific voltage level and converts the excess charging current to heat. The circuitry also allows charging of the individual cell if the actual voltage level is equal or less than the specific voltage level.

10 Claims, 4 Drawing Sheets

BATTERY CELL BY-PASS CIRCUIT

ORIGIN OF INVENTION

This invention described herein was made under NASA contract No. 10017, dated 1997. Therefore, it is subject to the provisions of Section 305 of the National Aeronautics And Space Act of 1958, Public Law 85–568 (72Stat. 435; 42U.S.C. 2457)

BACKGROUND OF THE INVENTION

1. Field of the Invention

The invention relates to the field of charging systems for batteries and, in particular, to charging system that prevents over charging of individual cells with a battery composed of a plurality of cells in series.

2. Description of Related Art

Certain types of batteries, such as Lithium-ion batteries are subject to damage if over charged. If there is a single battery cell in use, charging presents no problem. A simple charging system can be used that senses when the cell is fully charged and thereafter trickle charging are used to maintain the charge. One type of system switches off the charging current; for example U.S. Pat. No. 5,539,299 "Protection Switch For A Battery Powered Device" by J. M. Ferandez, U.S. Pat. No. 5,853,908 "Protection Device For Secondary Batteries" by T. Okutoh and U.S. Pat. No. 5,892, 145 "Battery Pack Unit, Control Method Therefore; Electronic Equipment Driven Power Supplied From Same Battery Pack Unit, And Recording Medium On Which Program For Controlling The Same Battery Pack Unit Is Recorded" by Y. Eguchi.

U.S. Pat. No. 5,049,804 "Universal Battery Charging System And A Method" by P. D. Hutchings and U.S. Pat. No. 5,164,652 "Method And Apparatus For Determining Battery Type And Modifying Operating Characteristics" by R. M. Johnson, et al., and U.S. Pat. No. 5,420,493 "Power Supply And Battery Charger" by A. Hargadon, et al. all disclose charging systems that can be used to charge various types of batteries. There are literally hundreds of battery charger designs for charging a single battery cell. However, when a battery is composed of a plurality of cells in series, such systems will not prevent an individual cell from being over charged, especially when the battery is composed of a plurality of Lithium-ion cells.

U.S. Pat. No. 5,969,502 "Battery Charger Capable Of Independently Charging Electromagnetic Cells". P. Beard discloses a charging system for a pair of cells arranged in series wherein the system independently controls charging of each cell. A resistor limits the current to the battery and a voltage equalizer is used to balance the cell voltage between the cells during charging. However, while this will work for a pair of cells in series it is not useful for a higher number of cells.

Thus, it is a primary object of the invention to provide a circuit for preventing the overcharging of an individual cell of a battery composed of a plurality of cells in series.

It is another primary object of the invention to provide a circuit for preventing the overcharging of an individual cell of a battery composed of a plurality of cells in series wherein each individual cell is provided with a charging by-pass circuit.

It is a further object of the invention to provide a circuit for preventing the overcharging of an individual cell of a battery composed of a plurality of cells in series wherein each individual cell is provided with a charging by-pass circuit and where the by-pass circuit dissipates the charging current by converting it into heat.

It is a further object of the invention to provide a circuit, which allows current to by-pass all cells at a specific state of charge with the purpose of equalizing the state of charge of each individual cell with the battery.

SUMMARY OF THE INVENTION

The invention is a circuit and method of limiting the charging voltage applied to an individual cell of a plurality of cells making up a battery being charged in series. It is particularly designed for use with batteries that can be damaged by overcharging, such as Lithium-ion type batteries. In detail, the method includes the following steps:

1. sensing the actual voltage level of the individual cell;
2. comparing the actual voltage level of the individual cell with a reference value and providing an error signal representative thereof; and
3. by-passing the charging current around individual cell necessary to keep the individual cell voltage level generally equal to a specific voltage level while continuing to charge the remaining cells. Preferably this is accomplished by by-passing the charging current around the 125 individual cell if said actual voltage level is above the specific voltage level and allowing the charging current to the individual cell if the actual voltage level is equal or less than the specific voltage level. In the step of bypassing the charging current the current is accomplished by dissipating the by-passed current as heat.

The by-pass circuit for limiting the charging voltage applied to an individual cell of a series of cells forming a battery, the cells being charged in series includes a voltage detection circuit to sense the actual voltage level of the individual cell. A voltage comparison circuit is used to compare the actual voltage level of the individual cell with a reference value and to provide an error signal representative thereof. A third circuit, designed to be responsive to the error signal, is provided for maintaining the individual cell voltage level generally equal to the specific voltage level. Circuitry is provided in the third circuit for bypassing charging current around the individual cell if the actual voltage level is above the specific voltage level and converts the excess charging current to heat. This is preferably accomplished by a MOSFET and power resistor in series placed in parallel with the individual cell for converting the by-passed current into heat. The circuitry also allows charging of the individual cell if the actual voltage level is equal or less than the specific voltage level.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
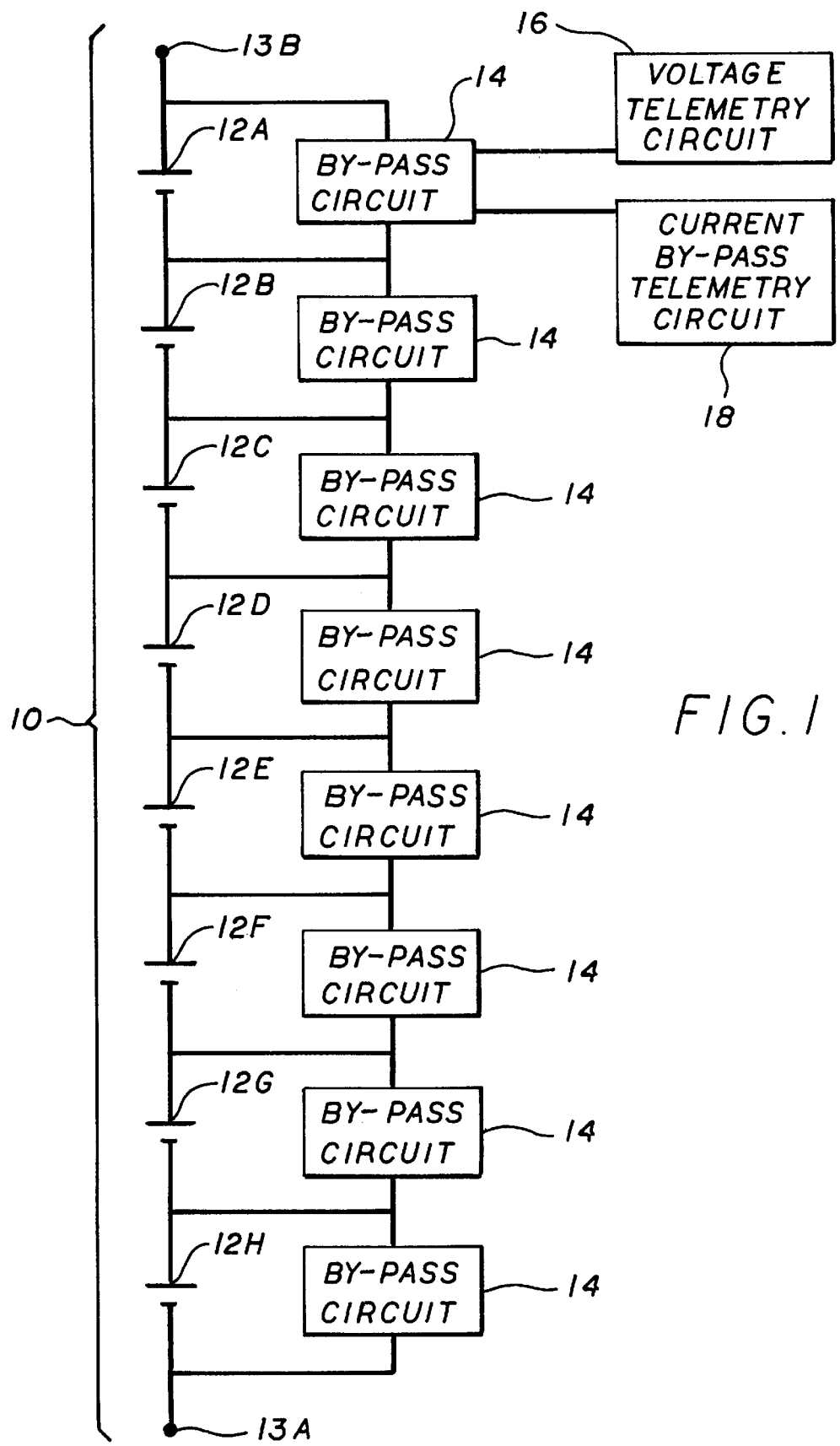
FIG. 1 is a block diagram of the battery system.
Figure 2:
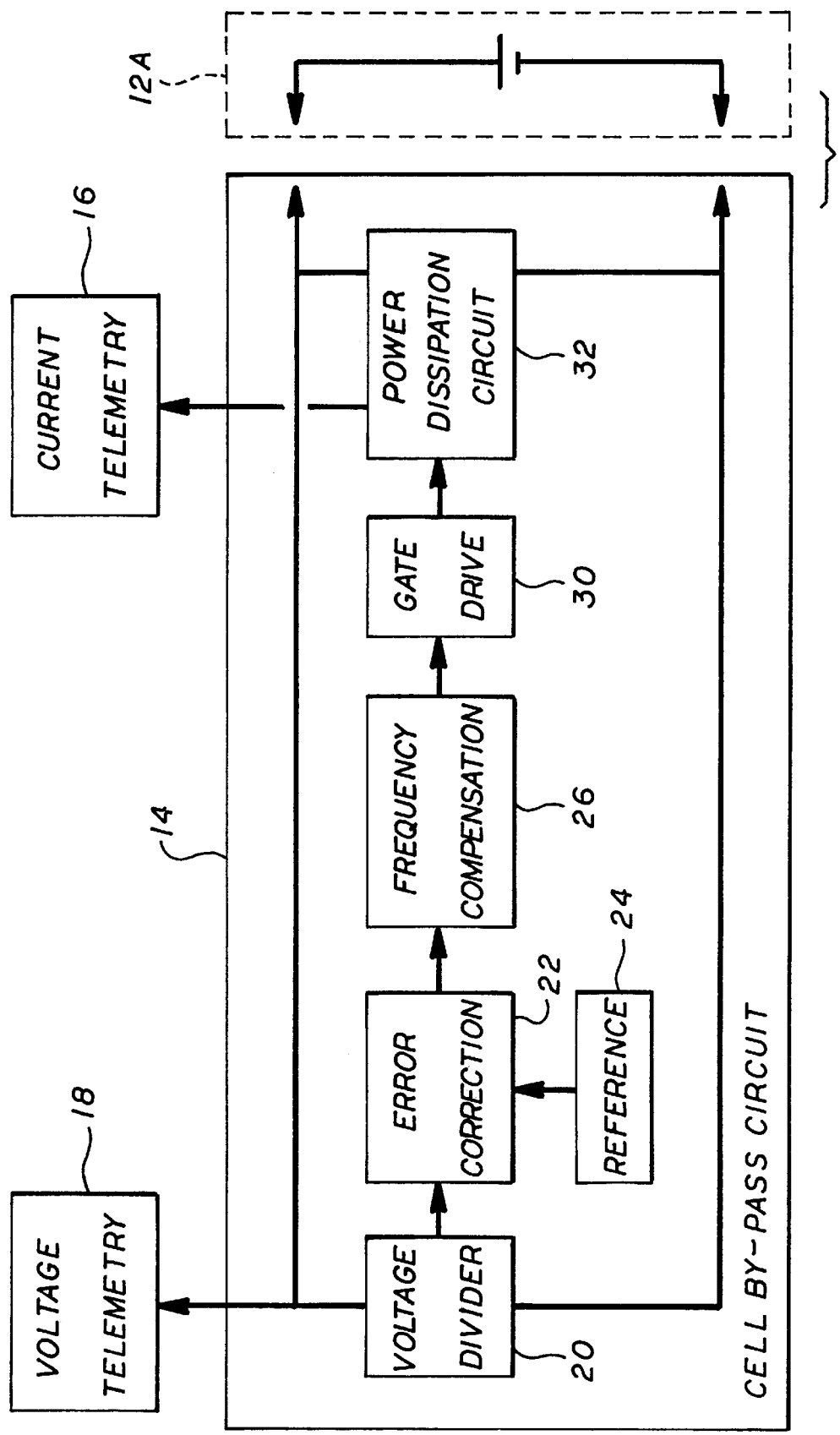
FIG. 2 is a block diagram of the current by-pass circuit.

Referring to FIGS. 1 and 2, a battery 10 is illustrated having eight cells 12A through 12H coupled to a charging circuit (not shown) at terminals 13A and 13B. If these cells are Lithium-Ion cells, they can be damaged if subjected to over charging. In general terms, a by-pass circuit 14 is coupled to each cell 12A–H of the battery 10 and prevents overcharging and also provides cell voltage and charging current levels to cell voltage telemetry circuit 16 and by-pass current telemetry circuit 18. In further detail, the by-pass circuit 14 includes a voltage divider circuit 20 is placed across each cell 12A–H and divides it down to a level that is usable by a error amplifier 22. The error amplifier 22 compares the output from the voltage divider circuit 20 to a reference signal generator 24. The output error signal from the error amplifier 22 is fed to a frequency compensation circuit 26, which shapes the error signal such that the feedback control system has the proper gain and phase margins to produce a stable feedback control system under all operating conditions. The output signal from the compensation circuit 26 is fed to a power dissipation circuit 32 where the current is by-passed around the battery cell 12A–H and dissipated as heat.

Figure 3:
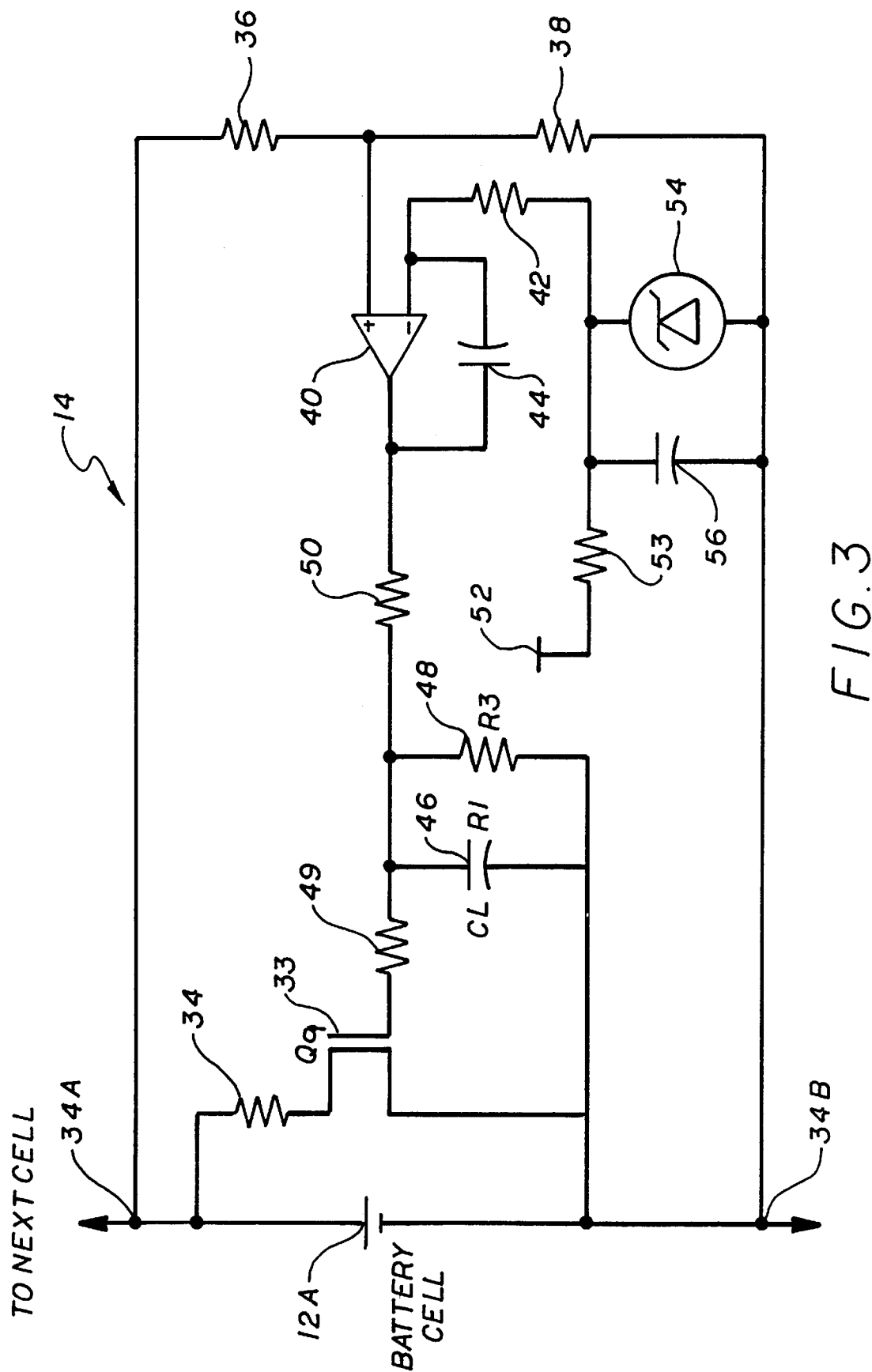
FIG. 3 is a schematic of the by-pass circuit

In FIG. 3, a schematic of the by-pass circuit 14 and a table of the components of the circuit are presented. A Lithium-ion battery 10 is shown with eight individual cells 12A–H in series. They are to be maintained at specific voltage level (fully charged level); in the example provided at a voltage of 4.175 volts. However, Lithium-ion batteries can be damaged if overcharged. The subject by-pass circuit 14 prevents overcharging of a particular cell from occurring. When eight cells are coupled in series they can become unbalanced and one or more cells may achieve a lower state of charge than the rest. In this case, the by-pass circuit 14 protects the cells that are fully charged while allowing the lover state of charge cells to be brought back to full charge, thus balancing all cells in the battery 12.

For purposes of illustration only the by-pass circuit for cell 12A is illustrated. To prevent overcharging, a Metal Oxide Semiconductor Field Effect Transistor (MOSFET) 33 in series with a resistor 34 is placed in parallel across the individual cell 12A and draws current whenever the voltage is over the allowable charging voltage and dissipates the by-passed current as heat. The MOSFET 33 is controlled in the following manner. The cell voltage measured across the cell is divided down by resistors 36 and 38 to a level usable by the operational amplifier 40. The operational amplifier 40 takes the divided down cell voltage from resistors 36 and 38 and compares it to a reference voltage. The error signal is then frequency shaped such that the feedback control system that is formed has the proper gain and phase margins to produce a stable feedback under all operating conditions. The resistor 42 and capacitor 44 form an integrator and frequency compensation for the control loop, while capacitor 46 and resisters 48 and 50 form a pole in the feedback control loop. Resistors 48 and 50 also divide the output voltage from the amplifier 40 to a suitable level to drive the gate of the MOSFET 33. The voltage source 52 is passed through a current limiting resistor 53, and set at the proper level by Zener diode 54 with capacitor 56 providing noise reduction and thereafter connected to the input side of amplifier 40. Resistor 49 provides for oscillation suppression in the MOSFET 33.

Figure 4:
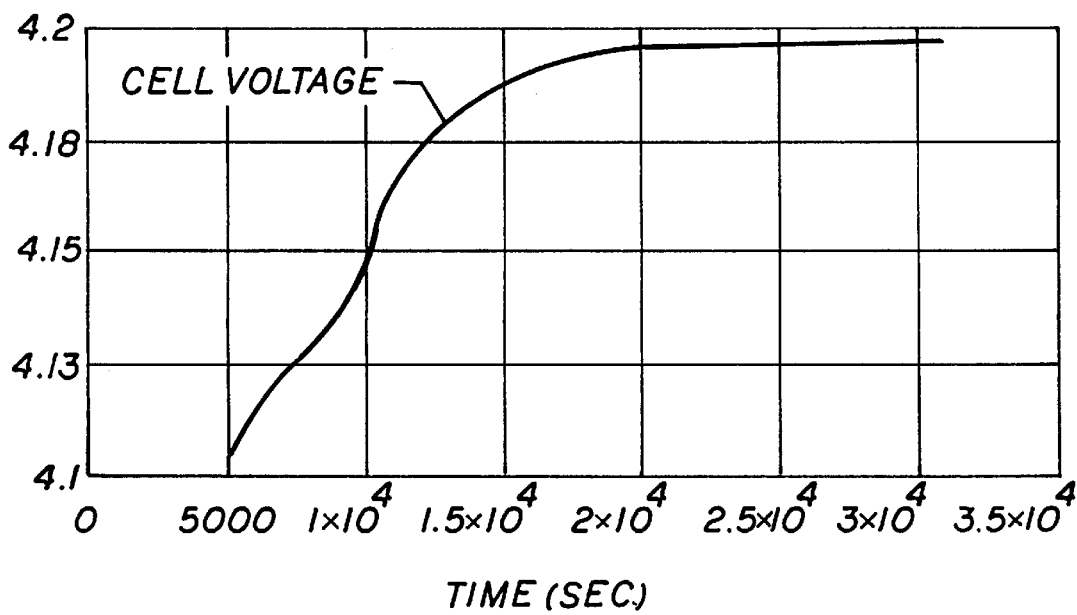
FIG. 4 is a graph of test results illustrating cell voltage versus time during a charge cycle.
Figure 5:
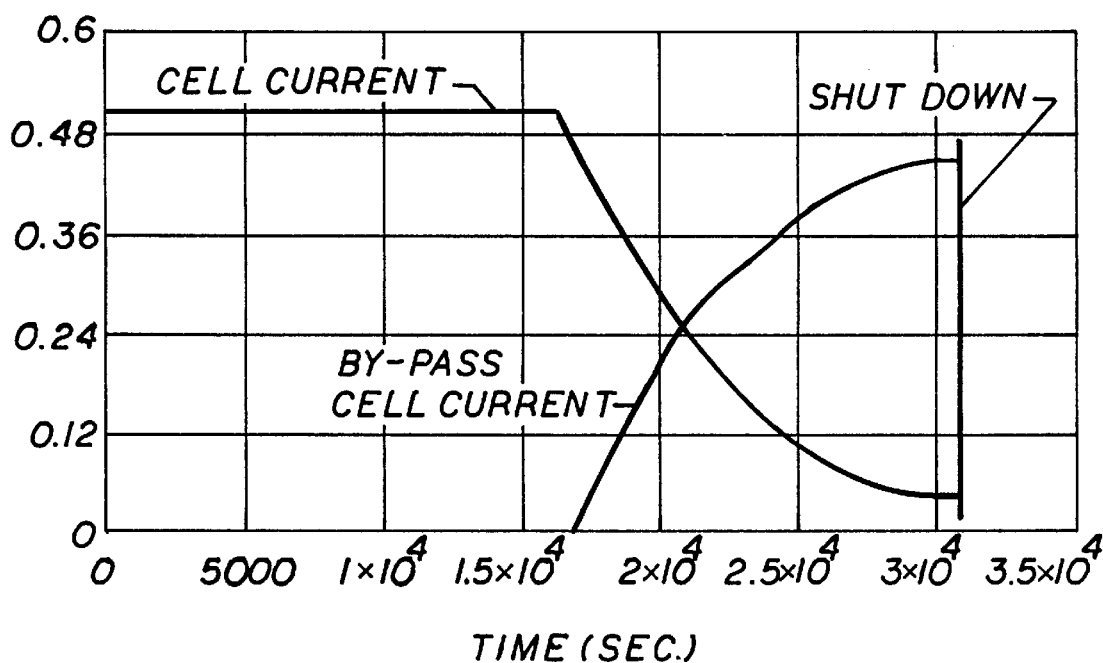
FIG. 5 is a graph of test results illustrating current by-pass as a function of time during a charge cycle.

FIGS. 4 and 5 are graphs of test results of the by-pass circuit 14. As previously mentioned, the Lithium-ion battery CELL is fully charged at 4.175 volts. Note that in this test, as cell was being charged current was held at about 4.4 amps. When the battery was fully charged, current began to be by-passed. Clearly the by-pass circuit 14 was able to prevent overcharging of the individual cell, while other cells were unaffected. Thus by incorporating a by-pass circuit 14 for each cell 12A–12H, overcharging, with the possible resulting damage is prevented. Cells that are undercharged will remain in a charging cycle.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the battery charger manufacturing industry.

What is claimed is:

1. A method of limiting the charging voltage applied to an individual cell of a plurality of cells making up a battery being charged in series, the method comprising the steps of:

sensing the actual voltage level of the individual cell;

comparing the actual voltage level of the individual cell with a specific voltage level and providing an error signal representative thereof; and by-passing the charging current around the individual cell to a level necessary to keep the individual cell voltage level generally equal to said specific voltage level while continuing to charge the remaining cells.

2. The method as set forth in claim 1 wherein the step of by-passing the charging current around the individual cell necessary to keep the individual cell voltage level generally equal to said specific voltage level includes the steps of:

by-passing said charging current around said individual cell if said actual voltage level is above said specific voltage level; and allowing said charging current to charge said individual cell if said actual voltage level is equal or less than said reference level.

3. The method as set forth in claim 2 wherein the step of by-passing said charging current around said individual cell if said actual voltage level above said specific voltage level includes the step of dissipating the by-passed current as heat.

4. The method as set forth in claim 3 wherein said series of cells are Lithium-ion cells.

5. A by-pass circuit for limiting the charging voltage applied to an individual cell of a series of cells forming a battery, the cells being charged in series, the by-pass circuit comprising:

first means to sense the actual voltage level of the individual cell;

second means to compare the actual voltage level of the individual cell with a specific voltage level and to provide an error signal representative thereof; and third means responsive to said error signal for by-passing the charging current around the individual cell to a level necessary to keep the individual cell voltage level generally equal to said specific voltage level while continuing to charge the remaining cells maintaining the individual cell voltage level generally equal to said reference level.

6. The by-pass circuit as set forth in claim 5 wherein said third means includes:
   means to by-pass said charging current around said individual cell if the actual voltage level is above said specific voltage level; and
   means to allow charging of the individual cell if the actual voltage level is equal or less than said specific voltage level.

7. The by-pass circuit as set forth in claim 6 wherein said means to by-pass said charging current around said individual cell converts the by-passed current into heat.

8. The by-pass circuit as set forth in claim 7 wherein said means to by-pass said charging current around said individual cell includes a MOSFET and power resistor placed in parallel with the individual cell for converting said by-passed current into heat.

9. The by-pass circuit as set forth in claim 8 wherein said second means is a voltage comparison circuit.

10. The by-pass circuit as set forth in claim 9 wherein said first means is a voltage detection circuit.

* * * * *